United States Patent
Simolon (10) Patent No.: US 10,962,420 B2
(45) Date of Patent: Mar. 30, 2021

(54) PULSE DETECTION AND IMAGING SYSTEMS AND METHODS

(71) Applicant: FLIR Systems, Inc., Wilsonville, OR (US)

(72) Inventor: Brian B. Simolon, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 243 days.

(21) Appl. No.: 16/213,712

(22) Filed: Dec. 7, 2018

(65) Prior Publication Data

US 2019/0204160 A1    Jul. 4, 2019

Related U.S. Application Data

(60) Provisional application No. 62/612,280, filed on Dec. 29, 2017.

(51) Int. Cl.
| | |
|---|---|
| *H04N 5/33* | (2006.01) |
| *G01J 11/00* | (2006.01) |
| *H04N 5/378* | (2011.01) |
| *H04N 5/3745* | (2011.01) |

(52) U.S. Cl.
CPC .......... *G01J 11/00* (2013.01); *H04N 5/33* (2013.01); *H04N 5/378* (2013.01); *H04N 5/3745* (2013.01)

(58) Field of Classification Search
CPC ........ H04N 5/3745; H04N 5/378; H04N 5/33; G01J 11/00; H01L 27/146

USPC ................................... 250/214 R, 208.1
See application file for complete search history.

(56) References Cited

U.S. PATENT DOCUMENTS

| | | | |
|---|---|---|---|
| 4,388,646 A * | 6/1983 | Strother | H04N 5/2173 250/203.6 |
| 8,581,168 B2 | 11/2013 | Linder et al. | |
| 9,215,386 B2 | 12/2015 | Elkind et al. | |
| 2016/0054434 A1 | 2/2016 | Williams et al. | |
| 2016/0211814 A1 | 7/2016 | Lin et al. | |
| 2016/0293647 A1 | 10/2016 | Lin et al. | |

OTHER PUBLICATIONS

Guellec et al., "Advanced Pixel Design for Infrared 3D Ladar Imaging", SPIE 6940, Infrared Technology and Applications XXXIV, May 5, 2008, 10 pages.

\* cited by examiner

*Primary Examiner* — Que Tan Le
(74) *Attorney, Agent, or Firm* — Haynes and Boone, LLP (57) ABSTRACT

Techniques are disclosed for facilitating pulse detection and imaging. In one example, a device includes a detector configured to detect electromagnetic radiation and generate a detection signal based on the detected electromagnetic radiation. The device further includes an input circuit configured to provide, based on the detection signal, a first signal and a second signal. The device further includes an imaging integration circuit configured to generate an image of at least a portion of a scene based at least in part on the first signal. The device further includes a pulse detection circuit configured to perform pulse detection to generate an indication of whether a pulse is detected in the portion of the scene based at least in part on the second signal. Related methods and systems are also provided.

20 Claims, 7 Drawing Sheets

PULSE DETECTION AND IMAGING SYSTEMS AND METHODS

CROSS REFERENCE TO RELATED APPLICATIONS

This application claims the benefit of and priority to U.S. Provisional Patent Application No. 62/612,280 filed Dec. 29, 2017 and entitled "PULSE DETECTION AND IMAGING SYSTEMS AND METHODS," which is incorporated herein by reference in its entirety.

TECHNICAL FIELD

One or more embodiments relate generally to imaging systems and more particularly, for example, to pulse detection and imaging systems and methods.

BACKGROUND

Imaging systems may include an array of detectors, with each detector functioning as a pixel to produce a portion of a two-dimensional image. In some cases, such as for infrared imaging, readout of image data captured by the detectors may be performed a time-multiplexed manner by a readout integrated circuit (ROIC).

SUMMARY

In one or more embodiments, a device includes a detector configured to detect electromagnetic radiation and generate a detection signal based on the detected electromagnetic radiation. The device further includes an input circuit configured to provide, based on the detection signal, a first signal and a second signal. The device further includes an imaging integration circuit configured to generate an image of at least a portion of a scene based at least in part on the first signal. The device further includes a pulse detection circuit configured to perform pulse detection to generate an indication of whether a pulse is detected in the portion of the scene based at least in part on the second signal.

In one or more embodiments, a method includes capturing electromagnetic radiation. The method further includes generating, by an input circuit, a detection signal based on the captured electromagnetic radiation. The method further includes generating, by the input circuit based on the detection signal, a first signal and a second signal. The method further includes generating, by an imaging integration circuit, an image of at least a portion of a scene based at least in part on the first signal. The method further includes generating, by a pulse detection circuit, an indication of whether a pulse is detected in the portion of the scene based at least in part on the second signal. The method further includes providing for transmission the image and indication.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In some embodiments, an imaging system may include an array of unit cells, where each unit cell has an input circuit that can separate a received detector signal into an alternating current (AC) detector component (e.g., also referred to as a high frequency detector component or a pulse detector component) from a direct current (DC) detector component (e.g., also referred to as a low frequency detector component or an image detector component). In an aspect, the AC detector component may be provided to a pulse detection circuit and the DC detector component may be provided to an imaging integration circuit. In some cases, the pulse detection circuit may be utilized for asynchronous laser pulse detection (ALPD) and thus may be referred to as an ALPD circuit. In an aspect, a pulse detection operation mode or simply pulse detection mode may refer to operation of the unit cells of the array for pulse detection, whereas an imaging operation mode or simply imaging mode may refer to operation of the unit cells of the array for imaging. In an aspect, the term pulse may refer to a laser pulse, any short duration light source, or generally any high frequency signal source that may be present in a scene. In some cases, the pulse may be present for a time in the microsecond or nanosecond range (e.g., 0.5 ns to 10 ns).

The unit cells may be configured to operate in the imaging mode alone, pulse detection mode alone, or simultaneously in the imaging and pulse detection modes. The pulse detection mode may be provided by a pulse detection path (e.g., also referred to as an AC path or a high frequency path) of the imaging system. The imaging mode may be provided by an imaging path (e.g., also referred to as a DC path or a low frequency path). Each path may include appropriate circuitry and control of such circuitry to facilitate the operation mode. In some cases, imaging modes associated with different gains may be provided, with each having an associated imaging path. As such, an imaging system that includes such an input circuit may allow for a fast changing input, such as from a laser pulse, to be detected, even while maintaining imaging capability (e.g., with a frame rate of 30 Hz or 60 Hz). In this regard, the input circuit may be referred to as an AC sensing circuit.

In an embodiment, the input circuit may include a buffered direct injection (BDI) circuit that can isolate a detector input capacitance from an imaging integration circuit included in an imaging path, allowing for lower noise performance for detectors and ROICs that have high input capacitance. In some aspects, the imaging integration circuit may include a capacitive transimpedance amplifier (CTIA) circuit. In this regard, in some cases, a large input capacitance may be mitigated at a detector node of an ROIC. For example, when a large input capacitance is present on a high-gain CTIA input architecture, noise of complementary metal-oxide-semiconductor (CMOS) components may be increased (e.g., amplified). By isolating the detector capacitance from a front-end of the CTIA circuit, the noise performance of CTIA imagers may be improved, such as in cases where there is a substantial amount of detector capacitance.

Thus, using various embodiments, techniques provided herein may be used in applications in which a scene may be imaged while simultaneously allowing short duration light sources (e.g., laser pulses) in the scene to be detected. In an aspect, such pulses may cause a sudden change in a detector signal (e.g., a detector current). In some cases, detection of such short duration light sources at specific pixel locations while simultaneously imaging may provide a user with a situational awareness of the scene (e.g., via the imaging mode) while knowing a location within a scene at which a light source is being targeted (e.g., via the pulse detection mode). For example, a laser pointer may be used to point to a portion of the scene (e.g., an object in the scene), such as to identify a particular location or object in the scene for various applications.

Figure 1:
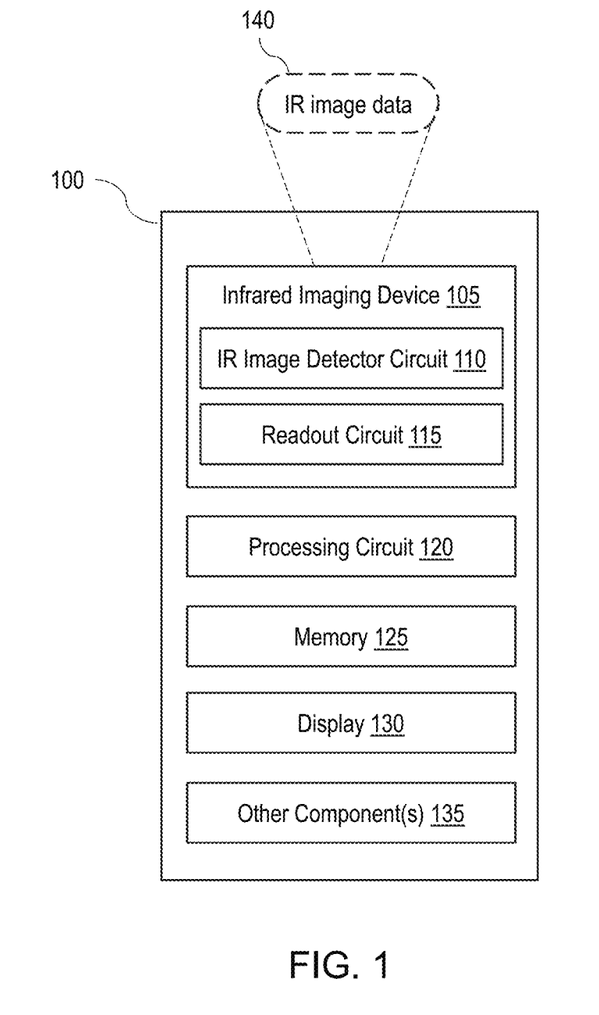
FIG. 1 illustrates a block diagram of an example imaging system in accordance with one or more embodiments of the present disclosure.

FIG. 1 illustrates a block diagram of an example imaging system 100 (e.g., an infrared imaging system) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 includes an infrared (IR) imaging device 105, a processing circuit 120, memory 125, a display 130, and/or other components 135. The IR imaging device 105 includes an IR image detector circuit 110 (e.g., a thermal IR detector circuit) and a readout circuit 115 (e.g., an ROIC). In some aspects, the IR image detector circuit 110 may capture (e.g., detect, sense) IR radiation with wavelengths in the range from around 700 nm to around 2 mm, or portion thereof. For example, in some aspects, the IR image detector circuit 110 may be sensitive to (e.g., better detect) mid-wave IR (MWIR) radiation (e.g., electromagnetic radiation (EM) with wavelength of 2-5 µm) and/or long-wave IR (LWIR) radiation (e.g., EM with wavelength of 7-14 µm), or any desired IR wavelengths (e.g., generally in the 0.7 to 14 µm range).

The IR image detector circuit 110 may capture an IR image associated with a scene (e.g., a real world scene). To capture the IR image, the IR image detector circuit 110 may detect IR image data 140 (e.g., in the form of IR radiation) associated with the scene and generate pixel values of the IR image based on the IR image data 140. An IR image may be referred to as an IR frame or an IR image frame. In some cases, the IR image detector circuit 110 may include an array of IR detectors that can detect IR radiation, convert the detected IR radiation into electrical signals (e.g., voltages, currents, etc.), and generate the pixel values based on the electrical signals. Each IR detector in the array may capture a respective portion of the IR image data 140 and generate a pixel value based on the respective portion captured by the IR detector. The pixel value generated by the IR detector may be referred to as an output of the IR detector. The IR detector may be referred to as a detector, sensor, or IR sensor.

The IR image may be, or may be considered, a data structure that includes pixels and is a representation of the IR image data 140, with each pixel having a pixel value that represents IR radiation emitted or reflected from a portion of the scene and received by an IR detector that generates the pixel value. Based on context, a pixel may refer to an IR detector of the IR image detector circuit 110 that generates an associated pixel value or a pixel (e.g., pixel location, pixel coordinate) of the IR image formed from the generated pixel values.

In an aspect, the pixel values generated by the IR image detector circuit 110 may be represented in terms of digital count values generated based on the electrical signals obtained from converting the detected IR radiation. For example, in a case that the IR image detector circuit 110 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the IR detector may be the digital count value output from the ADC circuit. In other cases (e.g., in cases without an ADC circuit), the pixel value may be analog in nature with a value that is, or is indicative of, the value of the electrical signal. In general, a larger amount of IR radiation being incident on and detected by the IR image detector circuit 110 is associated with higher digital count values and higher temperatures.

The readout circuit 115 may be utilized as an interface between the IR image detector circuit 110 that detects the IR image data 140 and the processing circuit 120 that processes the detected IR image data 140 as read out by the readout circuit 115. An image capturing frame rate may refer to the rate (e.g., images per second) at which IR images are detected in a sequence by the IR image detector circuit 110 and provided to the processing circuit 120 by the readout circuit 115. The readout circuit 115 may read out the pixel values generated by the IR image detector circuit 110 in accordance with an integration time (e.g., also referred to as an integration period, image integration period, or image integration time). Integration time for a detector may correspond to an amount of time that incoming radiation striking the detector is converted to electrons that are stored prior to a signal being read (e.g., in an integration capacitor that may be opened or shorted).

In various embodiments, a combination of the IR image detector circuit 110 and the readout circuit 115 may be, may include, or may together provide a focal plane array (FPA). In some aspects, the IR image detector circuit 110 may include an array of microbolometers, and the combination of the IR image detector circuit 110 and the readout circuit 115 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the IR imaging device 105 may include one or more filters adapted to pass IR radiation of some wavelengths but substantially block IR radiation of other wavelengths (e.g., MWIR filters, thermal IR filters, and narrow-band filters). Such filters may be utilized to tailor the IR imaging device 105 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

The processing circuit 120 may perform operations to process the pixel values received from the readout circuit 115. By way of non-limiting example, the processing circuit 120 may perform operations such as non-uniformity correction (NUC), spatial and/or temporal filtering, and/or radiometric conversion on the pixel values. The processing circuit 120 may be implemented as any appropriate processing device, such as a central processing unit (CPU), a graphics processing unit (GPU), a digital signal processor (DSP), a logic device, a microcontroller, an application specific integrated circuit (ASIC), a programmable logic device (PLD), a combination thereof, and/or other device. The processing circuit 120 may include combinations of hardware and software processing functionality and may be provided with/in and/or communicatively coupled to other components to execute appropriate instructions, such as software instructions and/or processing parameters (e.g., filtering coefficients, NUC correction terms) stored in the memory 125. In various embodiments, the processing circuit 120 may be configured to execute software instructions stored in the memory 125 to perform various methods, processes, or operations in the manner described herein. In some aspects, the readout circuit 115 and/or processing circuit 120 may include and/or may be coupled to circuitry to generate and provide clock signals and/or control signals for facilitating readout of image data captured by the IR image detector circuit 110. In some cases, the clock signals and control signals may provide appropriate timing for setting switches to a desired state (e.g., on or off state).

The memory 125 may be utilized to store information for facilitating operation of the imaging system 100. The memory 125 may store information such as instructions to be executed by the various components (e.g., the readout circuit 115 and/or processing circuit 120) of the imaging system 100, parameters associated with processing operations, information associated with previously generated images (e.g., for temporal filtering), and/or other information. By way of non-limiting examples, the memory 125 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 125 may include volatile memory, such as random-access memory (RAM), dynamic RAM (DRAM), static RAM (SRAM), etc. In some aspects, the memory 125, or a portion thereof, may be external to the imaging system 100 (e.g., an external memory accessible by the imaging system 100).

The display 130 (e.g., screen, touchscreen, monitor) may be used to display captured and/or processed images and/or other images, data, and/or information (e.g., legend relating color in the images with temperatures). For example, the images (or a visual representation of the images) may be displayed as individual static images and/or as a series of images in a video sequence. In addition, the imaging system 100 may include other components 135. By way of non-limiting examples, the other components 135 may be used to implement any features of the imaging system 100 as may be desired for various applications, such as clocks, batteries, motion sensors, temperature sensors, visible-light imaging device, communications components, and/or other components.

As one example, motion sensors may be implemented by one or more accelerometers, gyroscopes, and/or other appropriate devices that may be used to detect movement of the imaging system 100. The information provided by the motion sensors may facilitate image processing operations (e.g., spatial filtering, temporal filtering) performed by the processing circuit 120, such as by facilitating differentiation between motion in the scene relative to motion of the imaging system 100. As another example, communications components may facilitate wired and/or wireless communication between components within the imaging system 100 and/or between the imaging system 100 and other systems. Examples of communications components may include components (e.g., interfaces, connections) for facilitating communication using Universal Serial Bus (USB), Ethernet, WiFi, Bluetooth, cellular, infrared, radio, and/or other wired or wireless protocols.

Figure 2A:
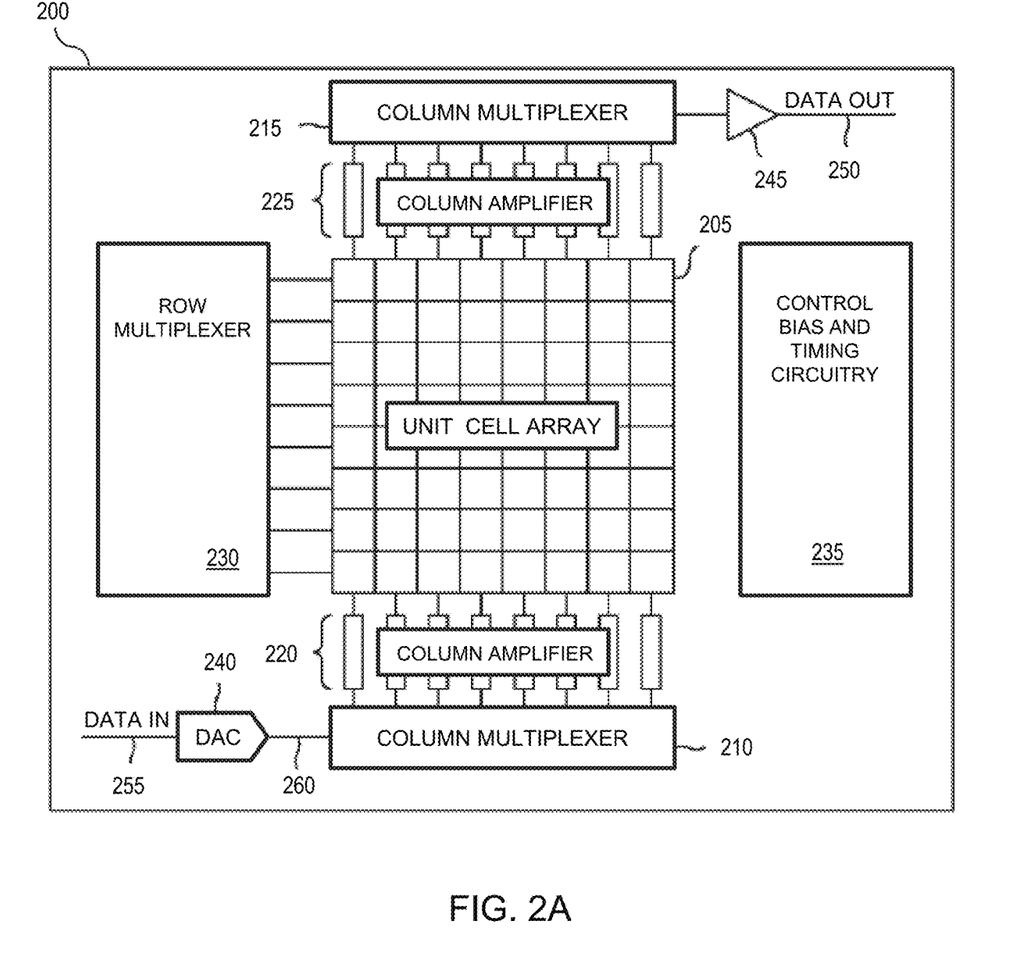
FIG. 2A illustrates a block diagram of an example focal plane array in accordance with one or more embodiments of the present disclosure.

FIG. 2A illustrates a block diagram of an example FPA 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the FPA 200 may include, may be a part of, and/or may be collectively provided by the IR image detector circuit 110 and readout circuit 115.

The FPA 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector and interface circuitry. The interface circuitry of each unit cell may provide an output signal, such as an output voltage or current, in response to a detector signal (e.g., detector current, detector voltage) provided by the detector of the unit cell. The output signal may be indicative of the magnitude of EM radiation received by the detector. The column multiplexer 215, column amplifiers 220, row multiplexer 230, and data output buffer 245 may be used to provide the output signals from the unit cell array 205 as a data output signal on a data output line 250. The data output signal may be an image formed of the pixel values for the FPA 200. In this regard, the column multiplexer 215, column amplifiers 220, row multiplexer 230, and data output buffer 245 may collectively provide an ROIC (or portion thereof) of the FPA 200.

In an aspect, the column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array traverses to get to the column multiplexer 215. As another example, the column amplifiers 225 may include an ADC for converting analog signals to digital signals. These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the readout circuit 115 and/or processing circuit 120 of FIG. 1.

In an aspect, the FPA 200 may be implemented as part of an imaging system (e.g., 100). In addition to the various components of the FPA 200, the imaging system may also include one or more processors, memories, logic, displays, interfaces, lenses, and/or other components as may be appropriate in various implementations. In an aspect, the data output signal on the data output line 250 may be provided to the processors (not shown) for further processing. For example, the data output signal may be an image formed of the pixel values from the unit cells of the FPA 200. The processors may perform operations such as NUC, spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz.

Figure 2B:
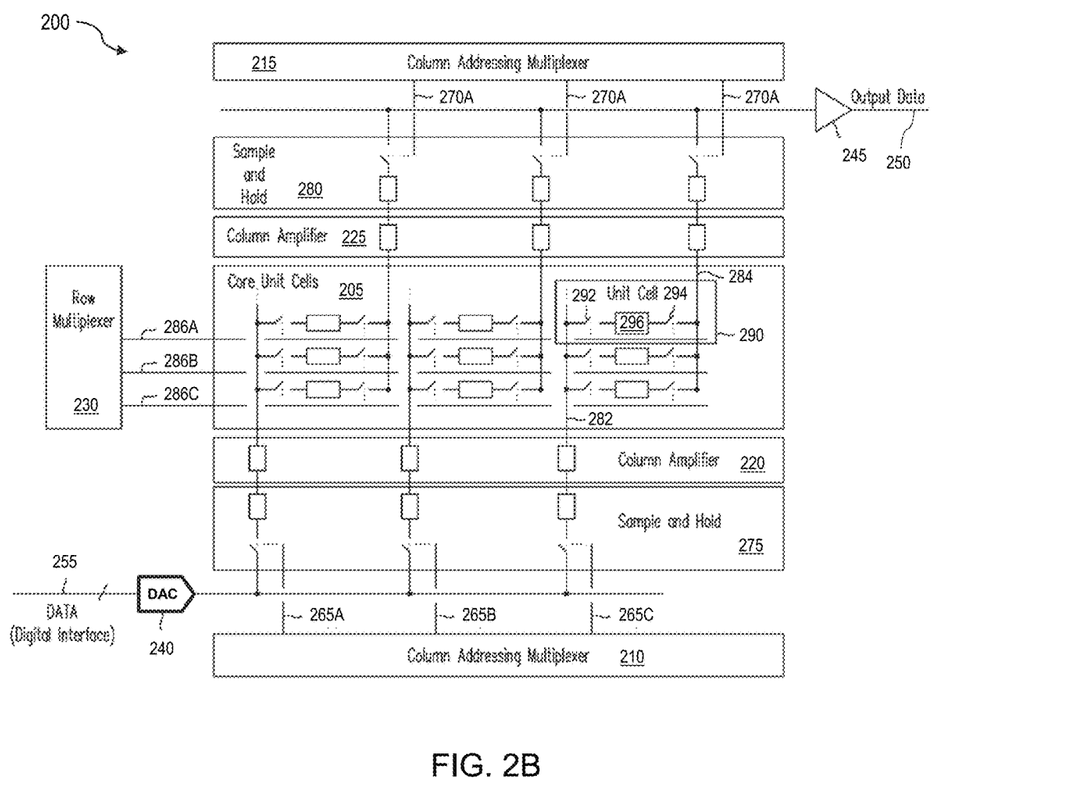
FIG. 2B illustrates an example of a detailed block diagram of the focal plane array of FIG. 2B in accordance with one or more embodiments of the present disclosure.

FIG. 2B illustrates an example of a detailed block diagram of the FPA 200 in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. The description of FIG. 2A generally applies to FIG. 2B, with examples of differences and other description provided herein for purposes of clarity and simplicity.

In addition to various components shown in FIG. 2B, FIG. 2B illustrates column enable lines 265A-C and 270A-C, sample and hold circuitry 275 and 280, column input lines 282, column output lines 284, and row enable lines 286A-C. The column addressing multiplexer 210 may operate the sample and hold circuitry 275 through the column enable lines 265A-C to selectively provide bias voltages from the DAC 240 to one or more columns of the unit cell array 205 through the column amplifiers 220 and column input lines 282.

As shown in FIG. 2B, each unit cell 290 of the unit cell array 205 may include an input switch 292, an output switch 294, and a main circuit 296. The main circuit 296 may include a detector, sample and hold circuitry, capacitors, and/or other components for facilitating imaging and/or pulse detection. The input switches 292 may be selectively closed by the row multiplexer 230 through the row enable lines 286A-C to provide bias voltages from the column input lines 282 to the main circuits 296. For example, the bias voltages may be provided to one or more capacitors of the main circuits 296. The input switches 292 may be selectively opened to isolate the main circuits 296 from the column input lines 282 (e.g. after the bias voltages are stored by one or more capacitors of the main circuits 296). As a result, the main circuits 296 may be effectively decoupled from the column input lines 282 (e.g., decoupled from bias voltage supply circuitry) and thus may remain relatively noise free while the unit cell array 205 detects one or more image frames during one or more integration periods and/or one or more pulse detections during one or more pulse detection periods.

In some embodiments, the bias voltages are not required to be provided anew to each unit cell 290 for each image frame. Instead, the bias voltages may be retained by each unit cell 290 (e.g., stored on one or more capacitors of each unit cell 290) over many integration periods (e.g., ranging from several to hundreds or even thousands of integration periods in various embodiments). In another embodiment, the bias voltages may be provided to each unit cell 290 for each image frame (e.g., for each integration period).

As discussed, the unit cells 290 may provide output signals in response to EM radiation (e.g., IR light) received by the detectors. The output switches 294 may be selectively closed by the row multiplexer 230 through the row enable lines 286A-C to provide the output signals, such as output voltages or currents from the main circuits 296 to the column output lines 284. In one embodiment, the input switches 292 and output switches 294 may be operated independently by the different row enable lines 286A-C. In another embodiment, the input switches 292 and output switches 294 may be operated substantially simultaneously by shared row enable lines 286A-C. The column addressing multiplexer 215 may operate the sample and hold circuitry 280 through the column enable lines 270A-C to selectively provide output signals from the column output lines 284 to the data output buffer 245.

In one embodiment, the column multiplexer 210 and row multiplexer 230 may be used to load bias voltages into unit cells 290. For example, bias voltages associated with a row of unit cells 290 may be sampled by the sample and hold circuitry 275 in response to column enable signals provided over the column enable lines 265A-C, and then loaded into a desired row of unit cells in response to row enable signals provided over the row enable lines 286A-C. Subsequently, the next set of bias voltages associated with a next row of unit cells 290 may be sampled by the sample and hold circuitry 275 and then loaded into the next row of unit cells 290. This process may continue until bias voltages have been provided to all unit cells 290 to complete an entire frame.

In one embodiment, each unit cell 290 may be configured to selectively isolate its bias voltage from other portions of the unit cell 290 until an integration (e.g., a light detection operation) is performed by the main circuits 296. For example, each unit cell 290 may initially store the bias signal received from a connected column input line 282 on a capacitor that remains disconnected from the detector of the main circuit 296 while other bias signal are loaded into other unit cells 290. Prior to an integration period, the capacitors of all unit cells 290 may be connected substantially simultaneously to one or more other capacitors and/or the detectors of such unit cells 290 by closing appropriate switches of the unit cells.

Figure 3:
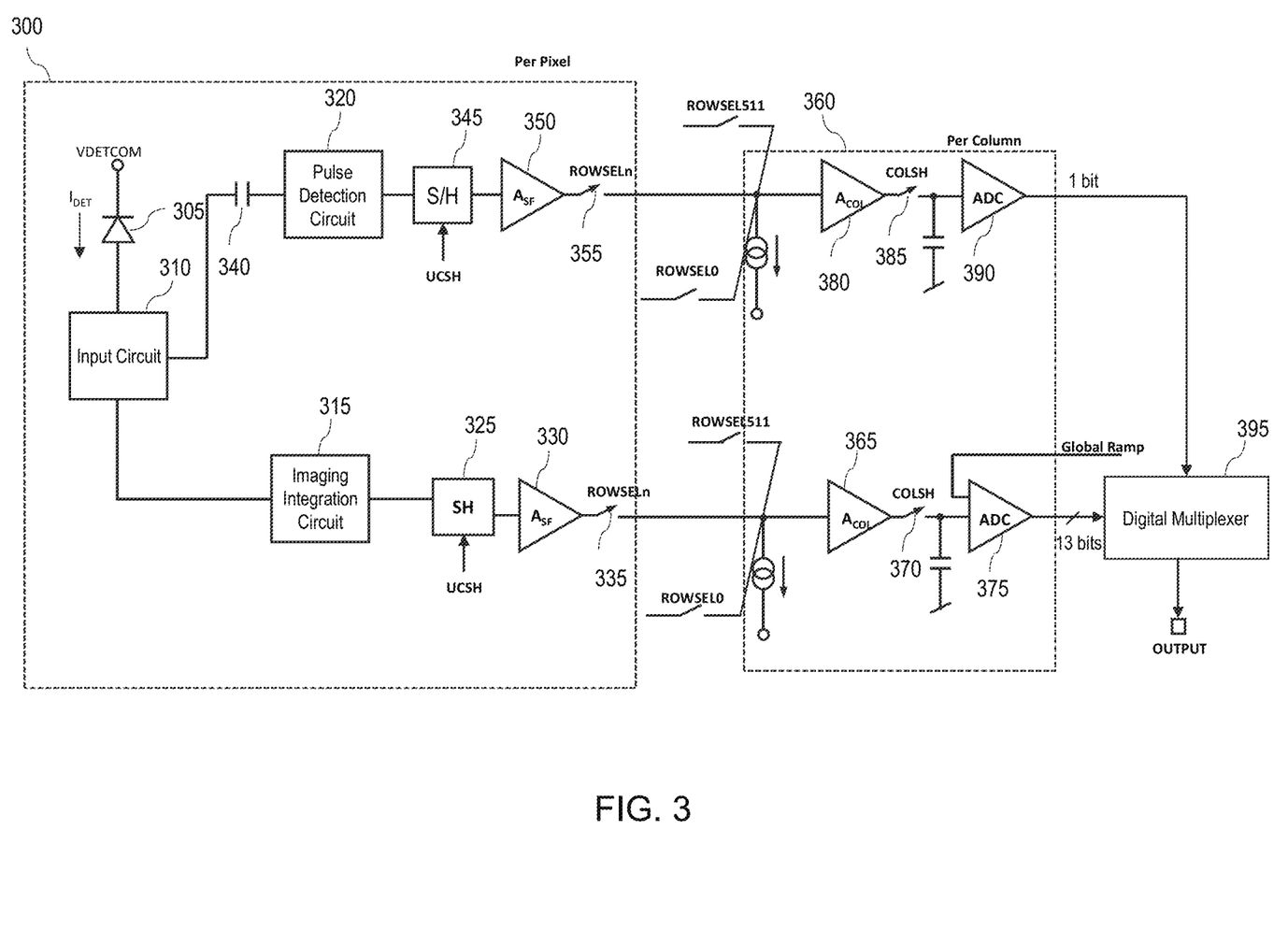
FIG. 3 illustrates an example unit cell and an associated per-column read out circuit in accordance with one or more embodiments of the present disclosure.

FIG. 3 illustrates an example unit cell 300 and an associated per-column read out circuit 360 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the unit cell 300 may be, may include, or may be a part of, a unit cell (e.g., 290) of the unit cell array 205.

The unit cell 300 includes a detector 305, an input circuit 310, an imaging integration circuit 315, and a pulse detection circuit 320. The detector 305 is connected to a detector voltage supply, denoted as $V_{DETCOM}$, and the input circuit 310. The detector 305 may generate a detector signal (e.g., detector current $I_{DET}$) based on captured image data (e.g., in the form of EM radiation) and provide the detector signal to the input circuit 310. In an aspect, the image data may be from a portion of a scene being imaged by an imaging system (e.g., 100) that includes the unit cell 300. By way of non-limiting example, the detector 305 may be a photodetector, such as an avalanche photodiode, an infrared photodetector, a quantum well infrared photodetector, microbolometer, or other detector capable of converting EM radiation (e.g., of a certain wavelength) to a detector signal (e.g., detector current $I_{DET}$). A magnitude of the detector signal is generally proportional to a magnitude of the EM radiation captured by the detector 305.

The input circuit 310 may generate signals (e.g., voltages, currents) based on the detector signal and provide the signals to the imaging integration circuit 315 and the pulse detection circuit 320. During an integration period, the imaging integration circuit 315 may generate an integration voltage by integrating (e.g., using an integration capacitor of the imaging integration circuit 315) signals that it receives from the input circuit 310. In this regard, the integration voltage is indicative of the image data (e.g., portion of a scene) captured by the detector 305. In an aspect, the portion of the scene captured by the detector 305 of the unit cell 300 may be referred to as an image or an image portion. At an end of the integration period, the imaging integration circuit 315 may provide the integration voltage to a sample and hold (S/H) circuit 325 to allow the S/H circuit 325 to sample and hold the integration voltage. The S/H circuit 325 may hold the integration voltage until a switch 335 is closed. For example, the switch 335 may be closed when a row of the unit cell array (e.g., 205 in FIG. 2A) that includes the unit cell 300 is being read out. The switch 335 may be referred to as a row-select switch.

In an aspect, once the integration voltage has been read out or sampled, the integration voltage may be cleared from the imaging integration circuit 315 using a reset circuit prior to a next integration period to facilitate a next integration operation of the imaging integration circuit 315. The reset circuit may include appropriate switches to cause a reset of the imaging integration circuit 315 (e.g., reset a voltage across an integrating capacitor of the imaging integration circuit 315 to zero). In some aspects, the imaging integration circuit 315 and/or the S/H circuit 325 may include a reset circuit (or portion thereof).

A buffer 330 may be utilized to isolate the integration voltage that is output from the imaging integration circuit 315 (e.g., as held by the S/H circuit 325) until the switch 335 is closed to allow readout of the integration voltage. In this regard, the buffer 330 may isolate the S/H circuit 325 from circuitry that follow the buffer 330 (e.g., per-column readout components to the right of the buffer 330 in FIG. 3). As an example, the buffer 330 may be, or may include, an analog voltage buffer with a source follower topology.

The pulse detection circuit 320 is coupled to the input circuit 310 via a capacitor 340. The capacitor 340 may receive signals from the input circuit 310. The capacitor 340 may block (e.g., attenuate) low frequency components, including DC components, of these signals from the pulse detection circuit 320 and pass high frequency components to the pulse detection circuit 320. As such, the capacitor 340 may be referred to as a DC blocking capacitor or an AC coupling capacitor. In some cases, the capacitor 340 may be, or may be considered a part of, the pulse detection circuit 320. The pulse detection circuit 320 may generate a pulse detection signal (e.g., a pulse detection voltage) based on the signals received by the pulse detection circuit 320 from the capacitor 340. The pulse detection signal may be indicative of whether the image data captured by the detector 305 (as represented by the detector current $I_{DET}$) includes a light pulse. In some cases, a peak (e.g., or any rapid, high frequency change) in the image data may be indicative of a light pulse being present in the image data.

The pulse detection circuit 320 is followed by an S/H circuit 345, a buffer 350, and a switch 355, which may provide similar functionality as the S/H circuit 325, buffer 330, and switch 355, respectively. In this regard, the S/H circuit 345 may hold the pulse detection signal and the buffer 350 may isolate the pulse detection signal that is output from the pulse detection circuit 320 (e.g., as held by the S/H circuit 345) until the switch 355 is closed to allow readout of the pulse detection signal. The switch 335 may be closed when a row of the unit cell array (e.g., 205 in FIG. 2A) that includes the unit cell 300 is being read out. In some cases, the pulse detection circuit 320 may be utilized for ALPD and thus may be referred to as an ALPD circuit. In an aspect, the S/H circuits 325 and 345 may be controlled by a UCSH control signal.

In an aspect, the pulse detection circuit 320 may generate the pulse detection signal during a pulse detection period (e.g., also referred to as a pulse detection time and denoted as $T_{PD}$ or $T_{ALPD}$). In some cases, the pulse detection period is set such that it does not overlap with a start time of the integration period, a stop time of the integration period, and a frame overhead time. Such timing may help reduce or avoid parasitics that may couple to the pulse detection circuit 320 or otherwise cause the pulse detection circuit 320 to erroneously generate a pulse detection signal indicating a pulse is detected when no such pulse is present. In some cases, layout and pixel size may be set as appropriate such that the pulse detection period may be set such that it can overlap with the start time of the integration period, stop time of the integration period, and/or a frame overhead time. In some cases, the pulse detection period may be set independent of the integration period (e.g., with or without needing to avoid overlap with the start time and/or stop time of the integration period and/or frame overhead time). In this regard, regardless of whether the integration period is short or long, a long pulse detection period may be utilized to allow a higher probability of detecting a pulse when a pulse is present. When the pulse detection circuit 320 detects no pulse, a readout associated with the pulse detection circuit 320 may indicate that no pulse has been detected.

In an aspect, once the pulse detection signal has been read out, the pulse detection signal voltage may be cleared from the imaging integration circuit 315 prior to a next pulse detection period to facilitate a next pulse detection operation of the pulse detection circuit 320. The reset circuit may include appropriate switches to cause a reset of the pulse detection circuit 320 (e.g., a capacitor(s) of the pulse detection circuit 320). In some aspects, the pulse detection circuit 320 and/or the S/H circuit 325 may include a reset circuit (or portion thereof).

During readout of the unit cell 300, the switches 335 and 355 are closed (e.g., by asserting the ROWSEL_n control signal) to connect the unit cell 300 to the per-column readout circuit 360. Other rows have their respective row-select switches, which are controlled by corresponding control signals ROWSEL_0 through ROWSEL_N in FIG. 3. For example, N may be 511 for a case with 512 rows (e.g., $0^{th}$ row to $511^{th}$ row). The integration voltage may be read out from the buffer 330 and isolated by a column buffer 365. The column buffer 365 may isolate the integration voltage until a switch 370 closes, signifying a time for the integration voltage to be converted to a digital signal by an ADC 375. In some cases, the ADC 375 may be a comparator that compares the integration voltage with one or more thresholds to determine a digital representation of the integration voltage. As an example, in FIG. 3, the ADC 375 generates a 13 bit output based on the integration voltage. In other cases, the digital representation of the integration voltage may be more or fewer than 13 bits.

Similarly, with the unit cell 300 connected to the per-column readout circuit 360, the pulse detection signal may be read out from the buffer 350 and isolated by a column buffer 380. The column buffer 380 may isolate the pulse detection signal until a switch 385 closes, signifying a time for the pulse detection signal to be converted to a digital signal (e.g., digital bit) by an ADC 390. In some cases, the ADC 390 may be a comparator that compares the pulse detection signal (e.g., pulse detection voltage) with a threshold to generate an output indicating whether or not a pulse has been detected. The ADC 390 may generate a 1 bit output based on the pulse detection signal. For example, the ADC 390 may generate a 1 to indicate that a pulse is detected and a 0 to indicate that no pulse is detected. Although the foregoing describes embodiments in which the output of the pulse detection circuit 320 is digitized to a 0 or 1 after being provided to the per-column readout circuit 360, in some embodiments the output of the pulse detection circuit 320 may be digitized or the output of the pulse detection circuit 320 may be digitized prior to being provided to the per-column readout circuit 360.

A digital multiplexer 395 may receive an output from each of the ADC 375 and 390. In this regard, in FIG. 3, the digital multiplexer 395 receives the 13 bit representation of a pixel of an image and a 1 bit indicator of whether a pulse is determined to be detected. The digital multiplexer 395 may provide the 13 bit representation of the pixel and/or the 1 bit indicator to one or more appropriate components for storage, display, and/or processing. In some cases, the digital multiplexer 395 may combine the outputs from the ADCs 375 and 390 to form a 14 bit output. For example, the 1 bit from the ADC 390 may be provided as a most significant bit (MSB) or least significant bit (LSB) of the 14 bit output. In an aspect, readout may be performed in an integrate-while-read (IWR) mode or integrate-then-read (ITR) mode.

In an embodiment, the unit cell 300 and per-column readout circuit 360 collectively provide a path associated with an imaging mode and a path associated with a pulse detection mode. In an aspect, the path associated with the imaging mode may include the input circuit 310, imaging integration circuit 315, S/H circuit 325, buffer 330, switch 335, buffer 365, switch 370, ADC 375, digital multiplexer 395, and/or other components, or a subset (e.g., formed of 310 and 315) of these components. This path may be referred to as an imaging mode path or a low frequency path. In an aspect, the path associated with the pulse detection mode may include the input circuit 310, capacitor 340, pulse detection circuit 320, S/H circuit 345, buffer 350, switch 355, buffer 380, switch 385, ADC 390, digital multiplexer 395, and/or other components, or a subset (e.g., formed of 310, 320, and 340) of these components. This path may be referred to as a pulse detection mode path or high frequency path.

Figure 4:
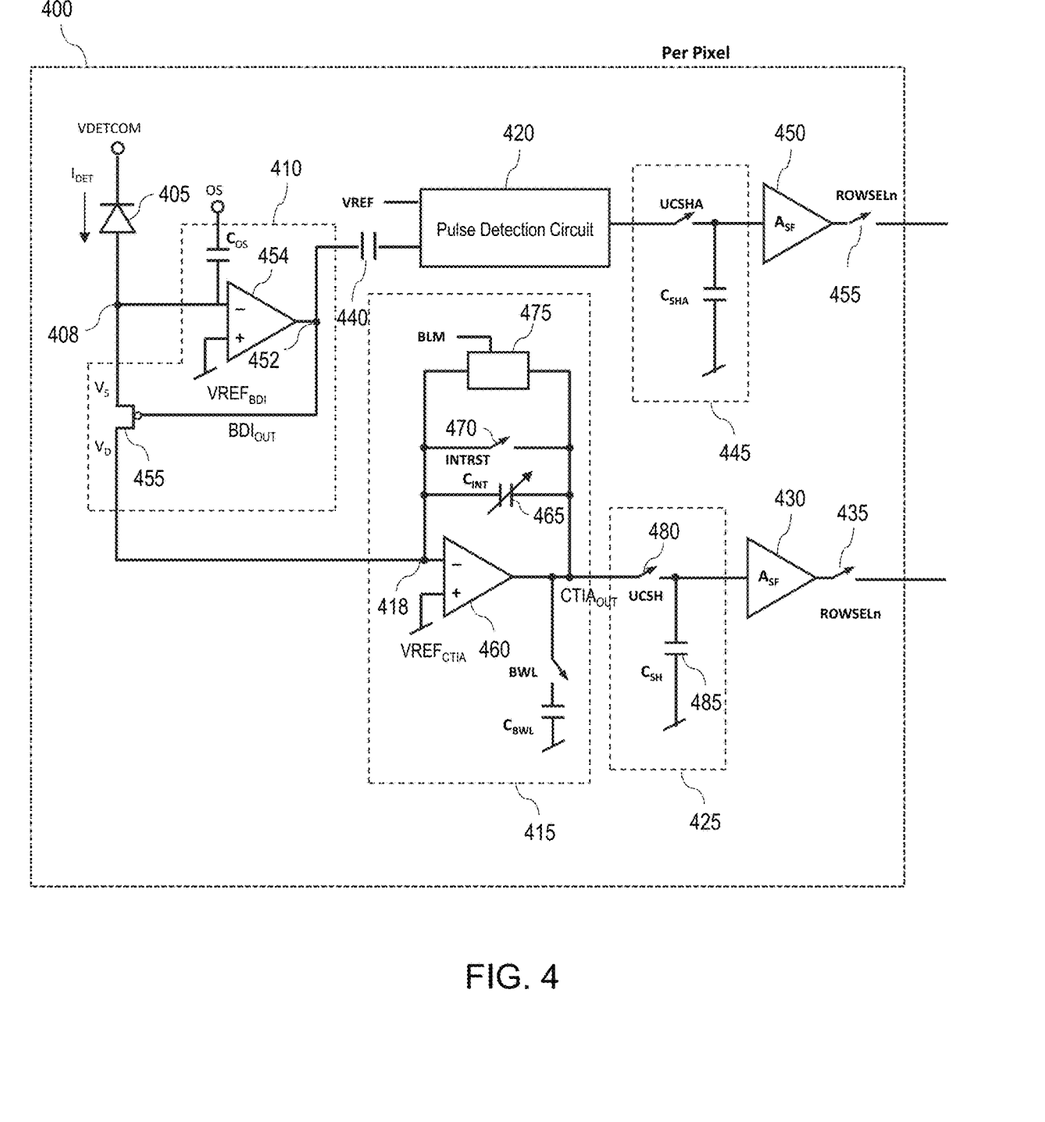
FIG. 4 illustrates an example of a unit cell in accordance with one or more embodiments of the present disclosure.

FIG. 4 illustrates an example of a unit cell 400 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the unit cell 400 may be, may include, or may be a part of the unit cell 300 of FIG. 3.

The unit cell 400 includes a detector 405, a BDI circuit 410 (e.g., also referred to as a feedback enhanced direct injection (FEDI) circuit), a CTIA circuit 415, and a pulse detection circuit 420. The BDI circuit 410 includes a buffer circuit 454 and a transistor 455. The CTIA 415 is coupled to the BDI circuit 410 (e.g., the transistor 455 of the BDI circuit 410). In an aspect, such coupling of the BDI circuit 410 to the CTIA 415 may allow AC detection of a pulse while at the same time reducing noise on imaging operations associated with the CTIA 415, such as in cases with a substantial amount of detector capacitance. In an aspect, the transistor 455 may be, or may be referred to as, a direct injection (DI) metal-oxide-semiconductor field effect transistor (MOSFET).

As shown in FIG. 4, the BDI circuit 410 may be utilized as an input circuit that interfaces with the detector 405, the CTIA circuit 415 (e.g., associated with imaging), and the pulse detection circuit 420 (e.g., associated with pulse detection). In this regard, the BDI circuit 410 may interface with the pulse detection circuit 420 via the capacitor 440. In some cases, the capacitor 440 may be considered a part of the pulse detection circuit 420. An input node of the buffer circuit 454 may be directly connected to a detector node 408. In some cases, the buffer circuit 454 may include a transistor, with the input node of the BDI circuit 410 being a gate of the transistor. The buffer circuit 454 generates an output (e.g., output voltage) $BDI_{OUT}$ at its output node 452 based at least on the detector current $I_{DET}$ received at its input node. In an aspect, the output $BDI_{OUT}$ of the buffer circuit 454 may also be referred to as an output of the BDI circuit 410. The output $BDI_{OUT}$ may be used to drive a gate of the transistor 455 and drive an input to the pulse detection circuit 420 through the capacitor 440 (e.g., also referred to as an AC coupling capacitor or a DC blocking capacitor). A source of the transistor 455 may be tied to the detector node 408 and a drain of the transistor 455 may be tied to an input of the CTIA circuit 415. In this regard, the BDI circuit 410 allows separation of an AC detector component of the detector current from a DC detector component. In an aspect, such separation may allow a fast changing input, such as from a laser pulse, to be detected.

The CTIA circuit 415 includes an amplifier 460, an integration capacitor 465 (e.g., also used for feedback and referred to as a feedback capacitor), and a reset switch 470. The integration capacitor 465 is coupled between an input and output of the CTIA circuit 415. The output $BDI_{OUT}$ drives the gate of the transistor 455 and causes the transistor 455 to close, such that the detector current $I_{DET}$ may be provided to the CTIA circuit 415. In some cases, the CTIA circuit 415 may include anti-blooming circuitry 475. Anti-blooming parameters may be provided by a BLM control signal. During an integration period, the reset switch 470 is open (e.g., in an off state) and the integration capacitor 465 integrates the detector current $I_{DET}$. In this regard, charge from the detector current $I_{DET}$ is accumulated on the integration capacitor 465 and develops a voltage across the integration capacitor 465. At an end of the integration period, an integration voltage across the integration capacitor 465 may be sampled and held by an S/H circuit 425. A switch 480 of the S/H circuit 425 may be closed (e.g., in an on state) at the end of the integration period to allow the integration voltage from the integration capacitor 465 to be sampled onto a capacitor 485 of the S/H circuit 425 and held by the capacitor 485. After the integration voltage is sampled and held, the reset switch 470 may close to short out the integration capacitor 465 to reset the integration capacitor 465 (e.g., set the integration voltage to zero through discharge of the integration capacitor 465) to facilitate a next integration period. The reset switch 470 may be controlled (e.g., turned on or off) by asserting (e.g., set to logic high) or deasserting (e.g., set to logic low) an INTRST control signal. A buffer 430 may provide appropriate isolation for the integration voltage held by the S/H circuit 425. In an aspect, the S/H circuit 425 may hold the integration voltage until the switch 435 is closed (e.g., for read out).

In some embodiments, reference levels (e.g., $VREF_{BDI}$ and $VREF_{CTIA}$) and biasing for the BDI circuit 410 and CTIA circuit 415 are set to allow sufficient drain to source voltage across the transistor 455 to keep the transistor 455 operating in saturation. As an example, the source may be at around 2.9 V and the drain may be at around 2.8 V. In some aspects, the CTIA circuit 415 may keep a voltage at the drain of the transistor 455 relatively constant (e.g., constant or substantially constant) over different image intensity levels, since the CTIA circuit 415 may hold its input node 418 at the reference level $VREF_{CTIA}$. In some cases, a constant (or substantially constant) drain to source voltage across the transistor 455 may keep the input node 418 of the CTIA circuit 415 and the output node 452 of the BDI circuit 410 at a constant (or substantially constant) voltage for a given detector current $I_{DET}$. With the output node 452 of the BDI circuit 410 held at a constant or near constant level, the output $BDI_{OUT}$ of the BDI circuit 410 is a low frequency (e.g., DC) signal blocked from the pulse detection circuit 420 by the capacitor 440.

In terms of imaging, the CTIA circuit 415 may integrate current that flows through the transistor 455 to produce across the integration capacitor 465 an integration voltage whose voltage level is based on an amount of current flowing through the transistor 455 and an integration time of the CTIA circuit 415. In some cases, for very low detector currents, the BDI circuit 410 may supply current through the transistor 455 to the CTIA circuit 415 at a slow rate relative to a case where only the CTIA circuit 415 is used as the input circuit interfacing with the detector 405. In some embodiments, even with minimal flux from a scene, a sufficient amount of dark current may be provided by the detectors such that the pixels respond within a frame to scene changes, which may be sufficient in various applications. As scene intensity increases, a bandwidth associated with the BDI circuit 410 also increases.

In some aspects, a combination of the BDI circuit 410 (e.g., as the input circuit) followed by the CTIA circuit 415 may mitigate various sources of parasitics, such as by allowing detector capacitance and generally any other parasitic capacitance on an input node of an associated ROIC to be isolated from an input of the CTIA circuit 415. The isolation may be associated with lower overall noise performance for detectors and ROICs, such as those having high input capacitance. In this regard, absent the BDI circuit 410 (e.g., with only the CTIA circuit 415 as the input circuit), detector capacitance, ROIC parasitics, and input capacitance of the CTIA circuit 415 itself all contribute to a capacitance at an input of the CTIA circuit 415 (denoted as $C_{in}$) and thus a boost in transistor (e.g., MOSFET) noise. Regarding imaging performance, noise from transistors of the CTIA circuit 415 may be amplified by a gain (e.g., closed-loop gain) of the CTIA circuit 415. Such gain may be around ($C_{in}/C_{int}$+1), where $C_{in}$ is the capacitance on the input of the CTIA circuit 415 and $C_{int}$ is the capacitance of the integration capacitor 465, with the detector capacitance, ROIC parasitics, and the input capacitance of the CTIA circuit 415 all contributing to $C_{in}$ and thus a boost in MOSFET noise.

As such, in some aspects, with the combination of the BDI circuit 410 and the CTIA circuit 415, input capacitance contributing to $C_{in}$ may include the CTIA input capacitance and generally some small amount of parasitics, with other sources of parasitics having been mitigated. In this regard, in an aspect, although noise may be contributed by the BDI circuit 410 (e.g., and amplified by the CTIA circuit 415), overall noise may be smaller than in a case that the BDI circuit 410 is not used. In some cases, mitigation of such parasitics through use of the combination of the BDI circuit 410 and CTIA circuit 415 may be desirable as pixel size is increased, since larger pixel sizes are generally associated with more detector capacitance and various parasitics than smaller pixel sizes.

To facilitate pulse detection, when the detector current $I_{DET}$ changes quickly due to a pulse of detector current (e.g., such as from a laser pulse input), the BDI circuit 410 may lower the voltage $BDI_{OUT}$ applied to the gate of the transistor 455 in response to the change in the detector current $I_{DET}$. The lowering of the gate voltage of the transistor 455 may allow more current to flow through the transistor 455 and to the CTIA circuit 415. In some cases, since a bandwidth associated with an output of the BDI circuit 410 may respond quickly to changes in the detector current whereas a bandwidth associated with the transistor 455 sinking more current from detector capacitance is relatively slow, the output $BDI_{OUT}$ may remain low until the transistor 455 has sunk the current associated with the pulse. In response to the pulse, the output $BDI_{OUT}$ has a high frequency component that can be AC coupled to the pulse detection circuit 420 to facilitate detection of the pulse. As such, the output $BDI_{OUT}$ of the BDI circuit 410 may facilitate AC detection since the output $BDI_{OUT}$ changes (e.g., only changes) when a current level of the detector current changes. In this regard, in an aspect, the BDI circuit 410 may be referred to as an AC sensing circuit.

A state indicative of a pulse having been detected or not detected may be generated by the pulse detection circuit 420. The state may then be sampled and held by an S/H circuit 445. A buffer 450 may provide appropriate isolation for the integration voltage held by the S/H circuit 445. In an aspect, the S/H circuit 445 may hold the state until a switch 451 is closed (e.g., for read out).

In some cases, as a DC level of the detector current increases, the bandwidth associated with the transistor 455 may also increase. In these cases, at higher DC detector current levels, the output $BDI_{OUT}$ of the BDI circuit 410 and the input to the pulse detection circuit 420 changes for a short duration due to an input pulse. To detect the pulse, the pulse detection circuit 420 may include circuitry with an appropriately high bandwidth to accommodate the short duration.

Figure 5:
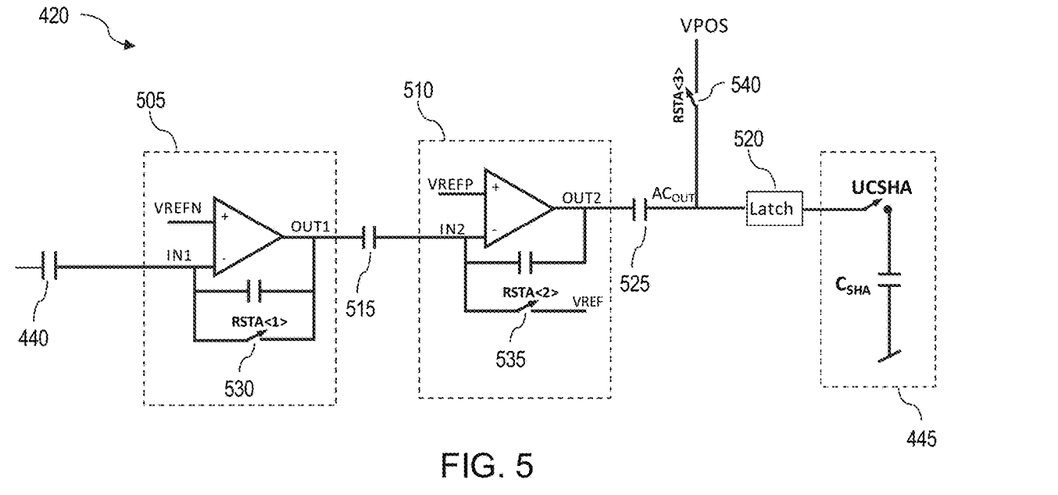
FIG. 5 illustrates an example implementation of a pulse detection circuit in accordance with one or more embodiments of the present disclosure.

An example of the pulse detection circuit 420 is described with respect to FIG. 5. FIG. 5 illustrates an example implementation of the pulse detection circuit 420 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The pulse detection circuit 420 may include an amplifier 505 (e.g., AC coupled amplifier) and a comparator 510 (e.g., AC coupled comparator). The amplifier 505 may be connected to the capacitor 440 on one end and the comparator 510 on another end through a capacitor 515. The amplifier 505 may provide a gain stage for the pulse detection circuit 420. Gain provided by the amplifier 505 may be used to amplify a small change in the detector current (e.g., such as from a small laser pulse) to a level sufficient to trigger the comparator 510. For example, the gain stage may be provided when an amount of gain provided by the BDI circuit 410 may not be sufficient. To trigger the comparator 510, an output of the amplifier 505 coupled through the capacitor 515 exceeds a threshold $VREF_P$ provided to the comparator 510. When triggered, the comparator 510 may generate a pulse detection signal that is indicative of a pulse having been detected by the pulse detection circuit 420. In some cases, an output of the comparator 510 may be referred to as an output of the pulse detection circuit 420.

The comparator 510 may provide the pulse detection signal to a latch 520, such that the latch 520 may be placed in a state indicative of a pulse having been detected. The state associated with the latch 520 may be sampled and held by the S/H circuit 445. In some cases, the state associated with the latch 520 may be refer to as the pulse detection signal, and vice versa, as these two signals have a direct correspondence. In some cases, an additional gain stage is not used. In such cases, the capacitor 440 may be connected directly to the comparator 510, without an intervening amplifier (e.g., 505).

Figure 6:
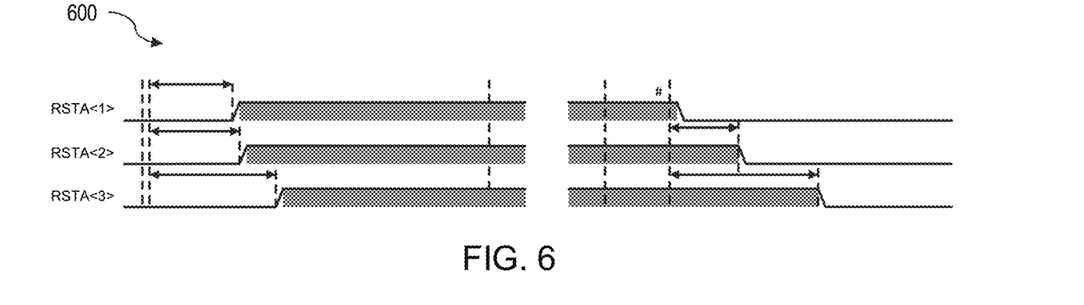
FIG. 6 illustrates an example timing diagram for operation of switches of the pulse detection circuit of FIG. 5 in accordance with one or more embodiments of the present disclosure.

In an aspect, to facilitate operation of the pulse detection circuit 420, RSTA<1>, RSTA<2>, and RSTA<3> control signals may be utilized to control corresponding switches 530, 535, and 540. FIG. 6 illustrates an example timing diagram 600 for operation of the switches 530, 535, and 540 of the pulse detection circuit 420. The RSTA<1> control signal may be deasserted (e.g., to open the switch 530) prior to desasserting the RSTA<2> and RSTA<3> control signals. The RSTA<1> control signal may be asserted (e.g., to close the switch 530 to facilitate reset) prior to asserting the RSTA<2> and RSTA<3> control signals. In an aspect, the switch 535 may be closed to provide a voltage VREF to an input node IN2 of the comparator 510 and opened after the input node IN2 has been set to the voltage VREF. In some cases, the voltage VREF may be close to a threshold point (e.g., set by $VREF_P$) of the comparator 510 such that an amount of time to accumulate enough charge to trigger the comparator 510 when a pulse is detected is generally small. As an example, with reference to FIGS. 5 and 6, an example voltages for operation of the unit cell 400 simultaneously in imaging mode and pulse detection mode may be Vs around 2.9 V, $V_D$ around 2.8 V, $CTIA_{OUT}$ around 2.8 V, IN1 around 0.6 V, OUT1 around 0.6 V, IN2 around 2.9 V, VREF around 2.9 V, OUT2 around 2.9 V, and $AC_{OUT}$ around 3.6 V.

Figure 7:
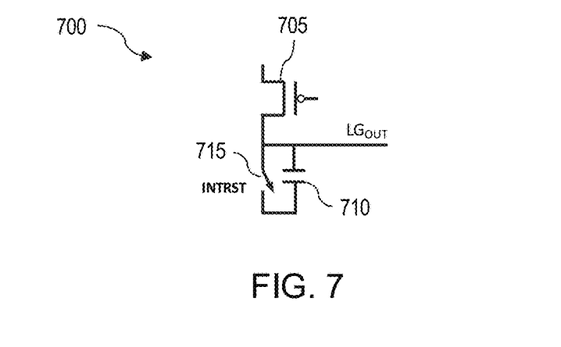
FIG. 7 illustrates an example imaging integration circuit in accordance with one or more embodiments of the present disclosure.

In an embodiment, the unit cell 400 may use the CTIA circuit 415 as an imaging integration circuit to provide a high-gain imaging mode. In some cases, to allow for a low-gain imaging mode, alternatively or in addition to the high-gain imaging mode, an imaging integration circuit for providing a low-gain imaging mode may be coupled to the BDI circuit 410. FIG. 7 illustrates an example imaging integration circuit 700 in accordance with one or more embodiments of the present disclosure. In an embodiment, the imaging integration circuit 315 may be, may include, or may be a part of, the CTIA circuit 415 and/or the imaging integration circuit 700. For example, the unit cell 300 may allow dynamic selection of the imaging mode based on application, such as by selectively coupling the BDI circuit 310 to the CTIA circuit 415 or the imaging integration circuit 700 via one or more switches. In an aspect, readout may be performed primarily using ITR mode for the low-gain imaging mode.

The imaging integration circuit 700 includes a transistor 705, an integration capacitor 710, and a reset switch 715. In an aspect, the transistor 705 may be coupled to the transistor 455 of the BDI circuit 410. During an integration period, the transistor 705 may be biased to pass the detection current $I_{DET}$ or portion thereof to the integration capacitor 710, and the integration capacitor 710 may integrate the received current. At an end of the integration period, the integration capacitor 710 may provide a resulting integration voltage as output. In an aspect, the integration voltage may be sampled and held by the S/H circuit 425 for subsequent readout. The reset switch 715 may then be closed to allow reset of the integration capacitor 710.

Figure 8A:
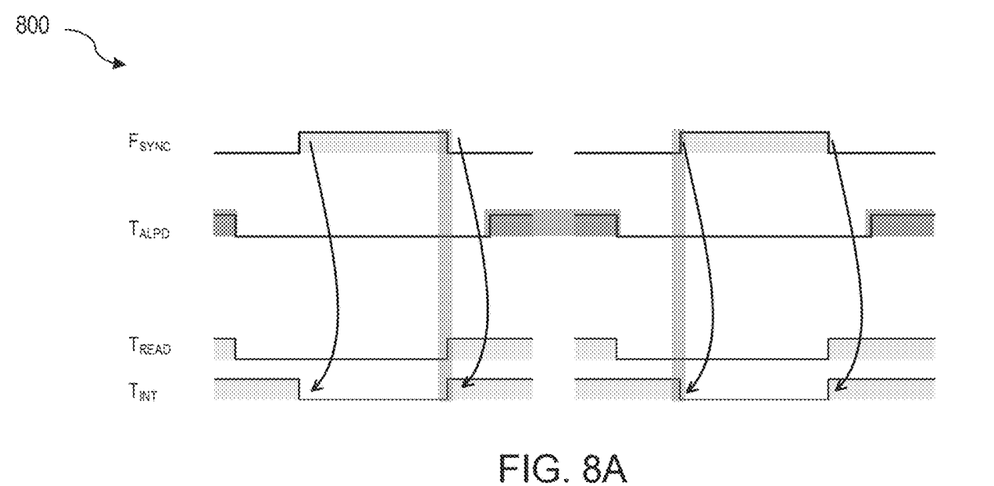
FIGS. 8A and 8B illustrate example timing diagrams for operation of a unit cell in accordance with one or more embodiments of the present disclosure.
Figure 8B:
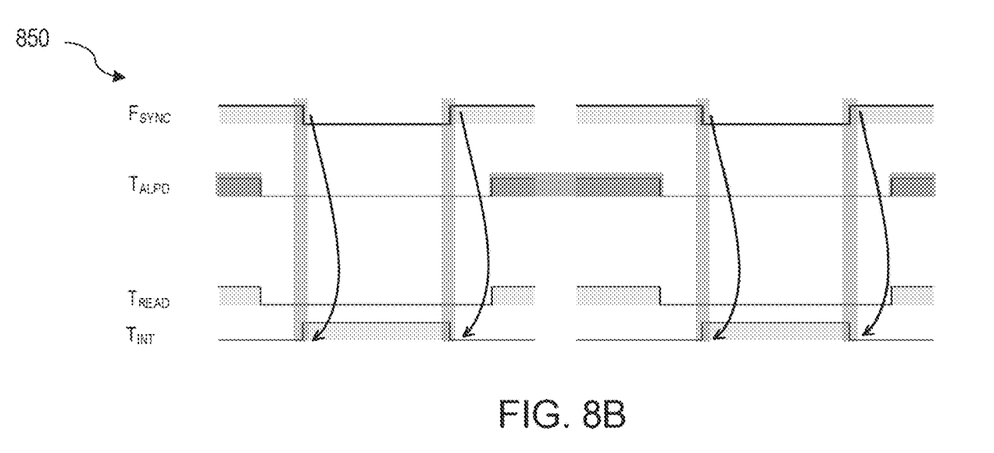

FIGS. 8A and 8B illustrate example timing diagrams 800 and 850, respectively, for operation of the unit cell 400 of FIG. 4 in accordance with one or more embodiments of the present disclosure. In an embodiment, the timing diagrams 800 and 850 may be associated with unit cells in the unit cell array 205 of FIG. 2. A frame sync signal $F_{SYNC}$ may be provided for each new frame to facilitate synchronization. In an aspect, as shown in the timing diagrams 800 and 850, integration starts at a falling edge of $F_{SYNC}$ and ends at a rising edge of the $F_{SYNC}$. In some cases, the frame sync signal may indicate that data values corresponding to bias coefficients for a new frame (e.g., for a complete set of all rows and columns of the unit cell array 205) are being provided on the data input signal line 255. In an aspect, the frame sync signal $F_{SYNC}$ may be generated by the control bias and timing circuitry 235 of FIGS. 2A and 2B.

A pulse detection period $T_{ALPD}$ (e.g., ALPD period) may provide a time duration during which the pulse detection circuit 420 is operated to perform pulse detection. An integration period $T_{INT}$ may provide a time duration during which the CTIA circuit 415 is operated to integrate the detector current for imaging. A read out period $T_{READ}$ may provide a time duration during which readout is performed.

With regard to FIGS. 8A and 8B, the timing diagram 800 shows a longer image integration period $T_{int}$ where the $T_{ALPD}$ overlaps with integration period (e.g., $T_{ALPD}$ is on during the integration period) to increase (e.g., maximize) an amount of time for the $T_{ALPD}$. The timing diagram 850 shows a shorter image integration period $T_{int}$ where the $T_{ALPD}$ is on during a reset time (e.g., $T_{ALPD}$ is off during the integration period) to increase (e.g., maximize) an amount of time for the $T_{ALPD}$. As an example, in the timing diagram 800, an entirety of $T_{ALPD}$ is within $T_{int}$. In the timing diagram 850, an entirety of $T_{ALPD}$ is outside of $T_{int}$. In some cases, the pulse detection period $T_{ALPD}$ may be set such that it does not overlap with a start time of an integration period, a stop time of an integration period, and a frame overhead time. Such timing may help reduce or avoid parasitics that may couple to the pulse detection circuit 420 or otherwise cause the pulse detection circuit 420 to erroneously generate a pulse detection signal indicating a pulse is detected when no such pulse is present, or vice versa. As an example, for a long integration period $T_{INT}$, $T_{ALPD}$ may be enabled after (e.g., just after) a start of integration to before (e.g., just before) an end of integration. As an example, for a short $T_{INT}$, $T_{ALPD}$ may be enabled during a time that an integrator is held in reset while a last frame is being read out. As an example, for $T_{INT}$ around half a frame time, $T_{ALPD}$ may be during integration or reset. In either case, the $T_{ALPD}$ on-time may have a maximum of around 50% duty cycle.

Although the foregoing describes unit cells (e.g., 300, 400) as operating (e.g., simultaneously operating) simultaneously in the imaging mode and pulse detection mode (e.g., ALPD mode), in some embodiments, a unit cell may be operated in only one operation mode or a different combination of operation modes. In the different operation modes, different circuitry can be enabled or disabled. In an aspect, a processing circuit (e.g., 120) may generate control signals that enable and/or disable the various operation modes dependent on application.

With reference to the unit cell 400 of FIG. 4, when the unit cell 400 is operating in the imaging mode and pulse detection mode, the BDI circuit 410, CTIA circuit 415, and pulse detection circuit 420, and associated sample/hold and read out circuitry are enabled. In an aspect, the imaging mode may be a low-gain imaging mode, high-gain imaging mode, or other imaging modes. When the unit cell 400 is operating in the imaging mode only (e.g., in a high-gain imaging mode only), the BDI circuit 410 and CTIA circuit 415 are enabled, whereas the pulse detection circuit 420 is disabled. For example, as part of disabling the pulse detection circuit 420, the switches 530, 535, and 540 may be closed. A bit in the pulse detection path may be set to zero (e.g., no pulse detected). In some cases, in the imaging only mode, a portion of the BDI circuit 410 may be disabled. For example, the buffer circuit 454 may be disabled (e.g., provide a zero volt output) while the transistor 455 passes the detector current $I_{DET}$ to the CTIA circuit 415. In some cases, the unit cell 400 may be operated in a low-gain imaging mode only, in which case the CTIA circuit 415 is decoupled from the BDI circuit 410 and a low-gain integration circuit (e.g., the imaging integration circuit 700 of FIG. 7) is coupled to the BDI circuit 410.

When the unit cell 400 is operating in the pulse detection mode only, the BDI circuit 410 and ALPD circuit 420 are enabled, whereas the CTIA circuit 415 is disabled. For example, to disable the CTIA circuit 415, the reset switch 470 may be closed. In this example, to facilitate faster read out, rather than read out the 14 bits from each pixel, a single bit associated with pulse detection is read out from each pixel (e.g., also referred to as pulse detection only or ALPD readout mode).

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A device, comprising:
    a detector configured to detect electromagnetic radiation and generate a detection signal based on the detected electromagnetic radiation;
    an input circuit configured to provide, based on the detection signal, a first signal and a second signal,
    an imaging integration circuit configured to generate an image of at least a portion of a scene based at least in part on the first signal; and
    a pulse detection circuit configured to perform pulse detection to generate an indication of whether a pulse is detected in the portion of the scene based at least in part on the second signal.

2. The device of claim 1, wherein the input circuit comprises a buffered direct injection (BDI) circuit, wherein the BDI circuit comprises:
    a buffer circuit coupled to the detector, imaging integration circuit, and pulse detection circuit; and
    a transistor coupled to the buffer circuit.

3. The device of claim 2, wherein the imaging integration circuit comprises a capacitive transimpedance amplifier (CTIA) circuit.

4. The device of claim 3, wherein the CTIA circuit comprises:
    an amplifier connected to the transistor of the BDI circuit, wherein the amplifier is configured to generate, at an output node of the amplifier, a CTIA output signal based at least in part on the first signal; and
    an integration capacitor connected to the transistor of the BDI circuit and the output node of the amplifier, wherein the integration capacitor is configured to generate an integration voltage based on the first signal and CTIA output signal.

5. The device of claim 2, wherein the buffer circuit is configured to:
    drive the second signal on a gate of the transistor; and
    drive the second signal on the pulse detection circuit through a capacitor.

6. The device of claim 5, wherein the transistor is configured to:
    receive the detection signal at a source of the transistor; and
    provide the first signal to the imaging integration circuit based on the second signal.

7. The device of claim 1, further comprising an alternating current (AC) coupling capacitor connected to the input circuit on one end and the pulse detection circuit on another end, wherein the pulse detection circuit comprises a comparator coupled to the input circuit, and wherein the comparator is configured to generate the indication based on the second signal.

8. The device of claim 7, further comprising:
    a first capacitor connected to the input circuit; and
    a second capacitor connected to the comparator,
    wherein the pulse detection circuit further comprises an amplifier connected to the first and second capacitors.

9. The device of claim 1, wherein:
    the imaging integration circuit is configured to perform integration during an integration period, and
    the pulse detection circuit is configured to perform pulse detection during a pulse detection period.

10. The device of claim 9, wherein the pulse detection period does not overlap with the integration period.

11. The device of claim 9, wherein the pulse detection period overlaps with a portion of the integration period.

12. The device of claim 9, wherein the pulse detection period does not overlap with a start time of the integration period and does not overlap with an end time of the integration period.

13. An imaging system comprising the device of claim 1, wherein:
    the device is a unit cell of a focal plane array of the imaging system,
    the detector is an infrared image detector;
    the imaging integration circuit is configured to provide the image for read out, and
    the pulse detection circuit is configured to provide the indication for read out.

14. A method, comprising:
    capturing, by a detector, electromagnetic radiation;
    generating, by an input circuit, a detection signal based on the captured electromagnetic radiation;
    generating, by the input circuit based on the detection signal, a first signal and a second signal;
    generating, by an imaging integration circuit, an image of at least a portion of a scene based at least in part on the first signal;
    generating, by a pulse detection circuit, an indication of whether a pulse is detected in the portion of the scene based at least in part on the second signal; and
    providing for transmission the image and indication.

15. The method of claim 14, wherein the input circuit comprises a buffered direct injection (BDI) circuit, wherein the BDI circuit comprises:
    a buffer circuit coupled to the detector, imaging integration circuit, and pulse detection circuit; and
    a transistor coupled to the buffer circuit.

16. The method of claim 15, wherein the imaging integration circuit comprises a capacitive transimpedance amplifier (CTIA) circuit, wherein the generating the image comprises:
    generating, by an amplifier of the CTIA circuit connected to the transistor, a CTIA output signal based at least in part on the first signal;
    accumulating charge in an integration capacitor of the CTIA circuit in response to the first signal; and
    generating an integration voltage based on the first signal and CTIA output signal.

17. The method of claim 15, further comprising:
    driving, by the buffer circuit, the second signal on a gate of the transistor; and
    driving, by the buffer circuit, the second signal on the pulse detection circuit through a capacitor.

18. The method of claim 17, further comprising providing the first signal to the imaging integration circuit based on the second signal from the buffer circuit.

19. The method of claim 14, wherein the pulse detection circuit comprises an amplifier and a comparator, the method further comprising:
    receiving, by the amplifier, the second signal through a capacitor;

amplifying the second signal; and
providing the amplified second signal to the comparator, wherein generating the indication comprises generating, by the comparator, the indication based at least in part on the amplified second signal.

20. The method of claim 14, wherein an integration period is associated with the image, wherein a pulse detection period is associated with the indication.

* * * * *